US011641970B2

(12) United States Patent
Qin et al.

(10) Patent No.: US 11,641,970 B2
(45) Date of Patent: May 9, 2023

(54) COOKING APPLIANCE

(71) Applicant: Instant Brands Inc., Ottawa (CA)

(72) Inventors: Yi Qin, Ottawa (CA); Jiwei Wang, Ottawa (CA)

(73) Assignee: Instant Brands Inc., Ottawa (CA)

( * ) Notice: Subject to any disclaimer, the term of this patent is extended or adjusted under 35 U.S.C. 154(b) by 751 days.

(21) Appl. No.: 16/661,567

(22) Filed: Oct. 23, 2019

(65) Prior Publication Data

US 2020/0128996 A1 Apr. 30, 2020

(30) Foreign Application Priority Data

Oct. 24, 2018 (CN) .......................... 201811247107.0
Nov. 23, 2018 (CN) .......................... 201811406893.4

(51) Int. Cl.
*A47J 27/08* (2006.01)
*A47J 36/38* (2006.01)
*A47J 27/09* (2006.01)

(52) U.S. Cl.
CPC ....... *A47J 27/0802* (2013.01); *A47J 27/0806* (2013.01); *A47J 27/09* (2013.01); *A47J 36/38* (2013.01)

(58) Field of Classification Search
CPC .... A47J 27/0802; A47J 27/0806; A47J 27/09; A47J 36/38
See application file for complete search history.

(56) References Cited

U.S. PATENT DOCUMENTS 6,648,162 B1 * 11/2003 Wooderson ............. A47J 27/09
220/203.27
11,197,572 B2   12/2021 Qin et al.
(Continued)

FOREIGN PATENT DOCUMENTS

CN         2469839 Y    1/2002
CN       201085461 Y    7/2008
(Continued)

OTHER PUBLICATIONS

Machine translation of CN-202636678 : Bai , Exhaust device for electric pressure cooker , 2013 (Year: 2013).*
Machine translation of CN-20678946 : Lee , A push-type switch self-locking mechanism and a push-type switch with the same , 2017 (Year: 2017).*
(Continued)

*Primary Examiner* — Brian W Jennison
*Assistant Examiner* — Abigail H Rhue
(74) *Attorney, Agent, or Firm* — Crowell & Moring LLP

(57) ABSTRACT

A cooking appliance is provided. The lid comprises a pressure-limiting valve, a lever, and a button assembly comprising a steam-discharging button and a button seat, the steam-discharging button being fastened to the button seat and being vertically movable for actuating the lever to activate the pressure-limiting valve for steam discharging. The button assembly comprises a guiding rod, the steam-discharging button comprises a heart-shaped groove. A downward movement of the steam-discharging button causes a first end of the guiding rod to slide within the heart-shaped groove. When the steam-discharging button is released, the first end of the guiding rod slides to a position for lockingly engaging with the heart-shaped groove, to keep the steam-discharging button at a steam-discharging position. Pressing the steam-discharging button once will lock the steam-discharging button for continuous steam discharging without the need to keep holding the button, thereby simplifying the discharging operation over prior art.

10 Claims, 11 Drawing Sheets

(56) References Cited

U.S. PATENT DOCUMENTS

| | | | |
|---|---|---|---|
| 11,259,664 B2 | 3/2022 | Qin et al. | |
| 2020/0128996 A1 | 4/2020 | Qin et al. | |
| 2022/0061576 A1 | 3/2022 | Qin et al. | |
| 2022/0142396 A1 | 5/2022 | Qin et al. | |

FOREIGN PATENT DOCUMENTS

| | | | |
|---|---|---|---|
| CN | 201085509 Y | | 7/2008 |
| CN | 201131628 Y | | 10/2008 |
| CN | 201234872 Y | | 5/2009 |
| CN | 201295132 Y | | 8/2009 |
| CN | 201328687 Y | | 10/2009 |
| CN | 201798578 U | | 4/2011 |
| CN | 202636678 U | * | 1/2013 |
| CN | 202801189 U | | 3/2013 |
| CN | 202820908 U | | 3/2013 |
| CN | 103040367 A | | 4/2013 |
| CN | 103405147 A | | 11/2013 |
| CN | 203302862 U | | 11/2013 |
| CN | 204839194 U | | 12/2015 |
| CN | 105996751 A | | 10/2016 |
| CN | 206789462 U | * | 12/2017 |
| CN | 206789462 U | | 12/2017 |
| CN | 209346662 U | | 9/2019 |
| CN | 209346665 U | | 9/2019 |
| CN | 110870681 A | * | 3/2020 |
| CN | 111084544 A | | 5/2020 |
| CN | 111084545 A | | 5/2020 |
| JP | H11259 A | | 1/1999 |

OTHER PUBLICATIONS

Machine translation of CN-110870681 : Li , Pot Lid Assembly and Cooking Utensils , 2020 (Year: 2020).*
Search Report for Chinese Patent Application No. 201811276097.3 dated Apr. 19, 2022, 2 pages.
Search Report for Chinese Patent Application No. 201811406893.4 dated Apr. 22, 2022, 2 pages.
Chinese Office Action with English Translation for Chinese Patent Application No. 201811276097.3 dated Apr. 26, 2022, 12 pages.
Chinese Office Action with English Translation for Chinese Patent Application No. 201811406893.4 dated Apr. 26, 2022, 10 pages.

* cited by examiner

COOKING APPLIANCE

CROSS REFERENCE TO RELATED APPLICATIONS

This application claims priority to China patent application 201811247107.0, filed Oct. 24, 2018 and is entitled "A Pressure Cooking Appliance with Lid", and China patent application 201811406893.4, filed Nov. 23, 2018, which are hereby incorporated by reference in its entirety, the entire contents of which are incorporated herein by reference.

TECHNICAL FIELD OF THE INVENTION

The present invention relates to a cooking appliance.

BACKGROUND OF THE INVENTION

Electric pressure cookers have become popular cooking appliances among consumers. A benefit of an electric pressure cooker is pressurized cooking. When cooking is completed, the pressure within the cooker is still very high, and the steam therein needs to be discharged to lower the pressure before the lid can be opened. Usually, a manually operated release valve is disposed on the lid of the cooker, wherein when the pressure in the cooker has been reduced to an acceptable level, the release valve/pressure limiting device can be manually turned on to discharge the steam. However, with the current design, the manual release valve requires pushing and holding a button to discharge the steam; otherwise the button will be restored to its default state and the release valve will be turned off. One problem with pushing and holding the button of the release valve is that a significant amount of hot steam may accompany the discharged vapor, and may cause scald injuries to the users.

Therefore, there is a need for improvements to the current cooking appliances.

SUMMARY OF THE INVENTION

The present invention provides a cooking appliance having a manually operated steam-discharging device that is easy to operate.

In accordance with one aspect of the present disclosure, there is provided a cooking appliance, comprising a cooker body; and a lid for covering the cooker body, the lid comprising a pressure-limiting valve, a lever, and a button assembly, the button assembly comprising a steam-discharging button and a button seat, the steam-discharging button being fastened to the button seat and being vertically movable for actuating the lever to push open the pressure-limiting valve for steam discharging; wherein the button assembly further comprises a guiding rod, the steam-discharging button further comprises a heart-shaped groove, wherein a downward movement of the steam-discharging button towards a predetermined position will cause a first end of the guiding rod to slide within the heart-shaped groove, and when the steam-discharging button is released after reaching the predetermined position, the first end of the guiding rod will slide to a lock position to lockingly engage with the heart-shaped groove, so as to keep the steam-discharging button at a steam-discharging position.

In accordance with some embodiments of the present disclosure, the button assembly further comprises a spring, wherein when the guiding rod is at the lock position, pushing the steam-discharging button downward will cause the guiding rod to leave the lock position, thereby unlocking the guiding rod from the heart-shaped groove, and wherein the spring will upwardly bias the steam-discharging button towards an initial position thereof, thereby causing the lever to return to its original position so that the pressure-limiting valve is correspondingly reset to a closed state.

In accordance with some embodiments of the present disclosure, the cooking appliance is an electric pressure cooker, wherein the lid comprises a lower lid portion and an upper lid portion covering the lower lid portion from above, wherein the button seat is disposed on a top wall of the lower lid portion, and wherein the steam-discharging button extends through and above the upper lid portion.

In accordance with some embodiments of the present disclosure, the steam-discharging button comprises a plastic block and a button cover for covering the plastic block from above, wherein the heart-shaped groove is formed on the plastic block, wherein the plastic block is constructed and arranged to move with the button cover, wherein the lever has a first end and an opposing second end, wherein the plastic block is operable to move downwardly through the button seat and press on the first end of the lever, thereby pivoting the second end of the lever upward to activate the pressure-limiting valve, and wherein the plastic block and the button cover are separately formed to simplify respective molds thereof.

In accordance with some embodiments of the present disclosure, the button cover comprises one or more latching arms disposed thereon, the button seat comprises one or more latching apertures disposed thereon, wherein the latching arms and the corresponding latching apertures mutually latch to secure the button cover and the plastic block to the button seat, wherein the spring is disposed between the steam-discharging button and the button seat and enclosing the plastic block and the guiding rod, so as to prevent the guiding rod from sliding out of the heart-shaped groove.

In accordance with some embodiments of the present disclosure, the guiding rod is substantially U-shaped and comprises a first end and a second end, wherein the second end of the guiding rod is rotatably secured to a bottom portion of the button seat.

In accordance with some embodiments of the present disclosure, the plastic block is substantially L-shaped and comprises a substantially vertically extending first portion and a second portion extending sideward from a bottom part of the first portion, wherein the heart-shaped groove is disposed on a surface of the first portion of the plastic block.

In accordance with some embodiments of the present disclosure, the button seat is formed by combining a first button seat with a second button seat, wherein the first portion of the plastic block is disposed between the first button seat and the second button seat and is vertically movable therebetween, and wherein the second portion of the plastic block is disposed under the button seat so as to confine the plastic block with the button seat.

In accordance with some embodiments of the present disclosure, the second portion of the plastic block comprises a projecting block having a sloped surface, wherein the lid comprises an opening-stop rod constructed and arranged for outward sliding movement relative to the lid when the lid is rotated towards a closed position relative to the cooker body, wherein when the steam-discharging button is at a steam-discharging position, the opening-stop rod will downwardly press the sloped surface during the outward sliding movement causing the plastic block to move downwardly to unlock the guiding rod from the heart-shaped groove, thereby allowing the spring to bias the steam-discharging button to return to the initial position thereof and to cause the lever to correspondingly return to the original position thereof, so as to put the pressure-limiting valve in the closed state when the lid is rotated towards the closed position, wherein when the steam-discharging button is at a higher location, the second portion of the plastic block is located above the opening-stop rod, such that the opening-stop rod is operable for the outward sliding movement without contacting the projecting block.

In accordance with some embodiments of the present disclosure, the lid comprises a sliding rod disposed thereon, the sliding rod comprising a third end and a fourth end, the third end extending under the pressure-limiting valve, the fourth end extending along a portion of the lid into the cooker body, wherein the cooker body comprises a gradually elevated inclined surface disposed therein, wherein when the lid is rotated relative to the cooker body towards an open position, the fourth end is gradually elevated along the inclined surface causing the third end of the sliding rod to push open the pressure-limiting valve, thereby opening the pressure-limiting valve when the lid is rotated towards the open position.

With a cooking appliance in accordance with example embodiments of the present disclosure, by pressing the steam-discharging button on the lid once, a user can lock the steam-discharging button at a steam-discharging position for continuous steam discharging, without the need to keep the steam-discharging button pressed down, thereby simplifying the steam-discharging operation. Further, pressing the steam-discharging button again will return the steam-discharging button to an initial position thereof, thereby closing the pressure-limiting valve to stop the steam discharging.

It is to be understood that, the aforementioned general description and the detailed description that follows are exemplary and explanatory, and are not limiting or exhaustive as to the embodiments of the present invention.

Figure 1:
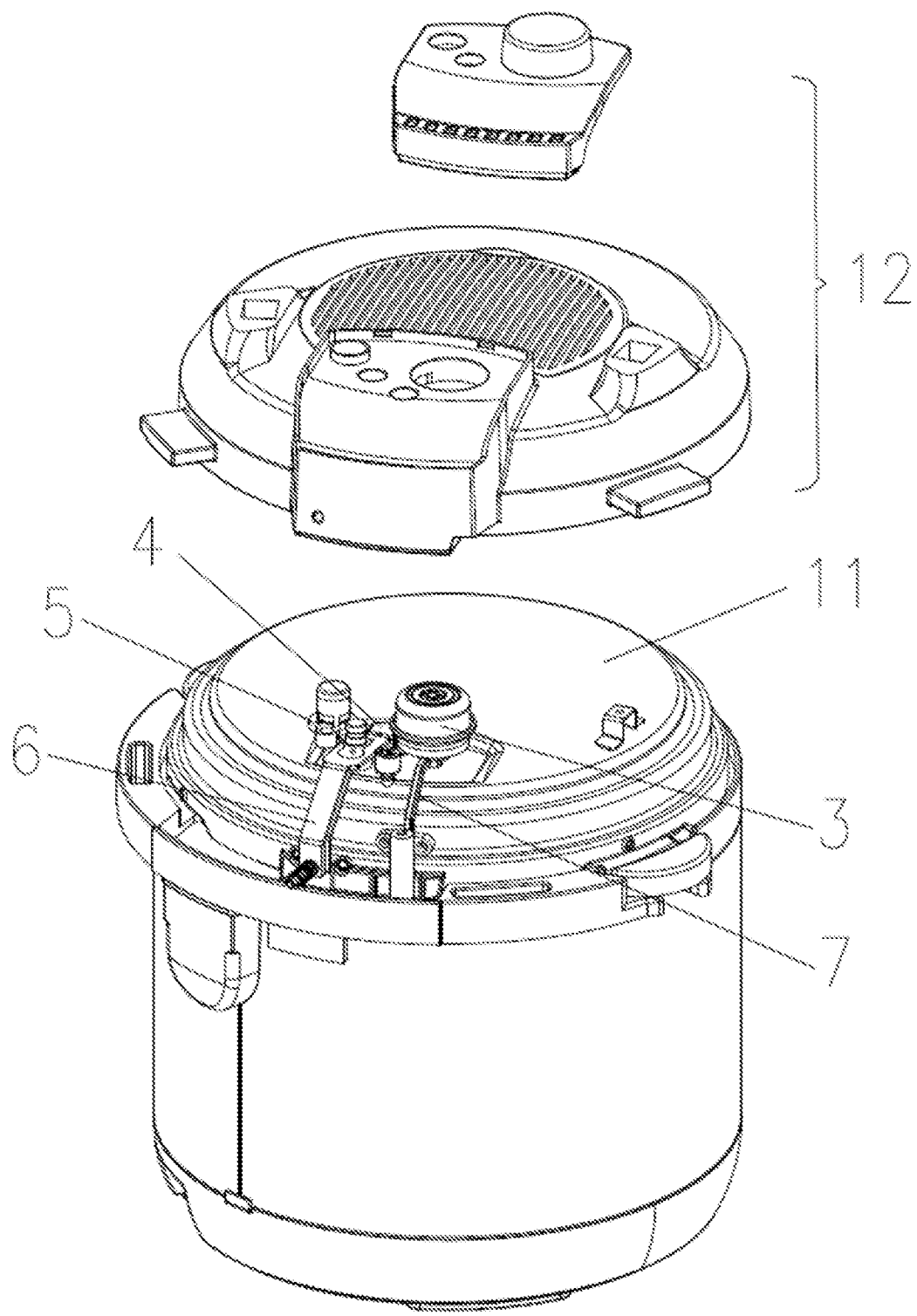
FIG. 1 is a partial exploded perspective view illustrating a cooking appliance in accordance with an example embodiment of the present disclosure.

REFERENCE NUMERALS 1 lid
11 lower lid portion
12 upper lid portion
2 cooker body
3 pressure-limiting valve
4 lever
41 first end
42 second end
5 button assembly
51 steam-discharging button
510 heart-shaped groove
511 heat-shaped block
52 button seat
520 latching aperture
521 first button seat
522 second button seat
523 seat opening
524 pin
525 socket
53 guiding rod
530 first end
531 second end
54 spring
55 plastic block
551 first portion
552 second portion
553 projecting block
554 sloped surface
56 button cover
560 latching arm
6 opening-stop rod
60 indentation
7 sliding rod
70 third end
71 fourth end
20 inclined surface
A lock position

DETAILED DESCRIPTION

Exemplary embodiments will be described in detail herein, examples of which are illustrated in the accompanying drawings. When the following description refers to the accompanying drawings, unless otherwise indicated, the same numbers in different drawings represent the same or similar elements. The embodiments described in the following exemplary embodiments do not represent all embodiments consistent with the present invention. Instead, they are merely examples of devices, systems, equipment and methods consistent with some aspects of the present disclosure as detailed in the appended claims.

The terms used in the present application are for the purpose of describing particular embodiments only, and are not intended to limit the present application. As used herein and in the appended claims, the singular forms "a", "an", and "the" are intended to include the plural forms unless the context clearly dictates otherwise. It should also be understood that, as used herein, the term "and/or" refers to and includes any or all possible combinations of one or more of the associated listed items.

Figure 2:
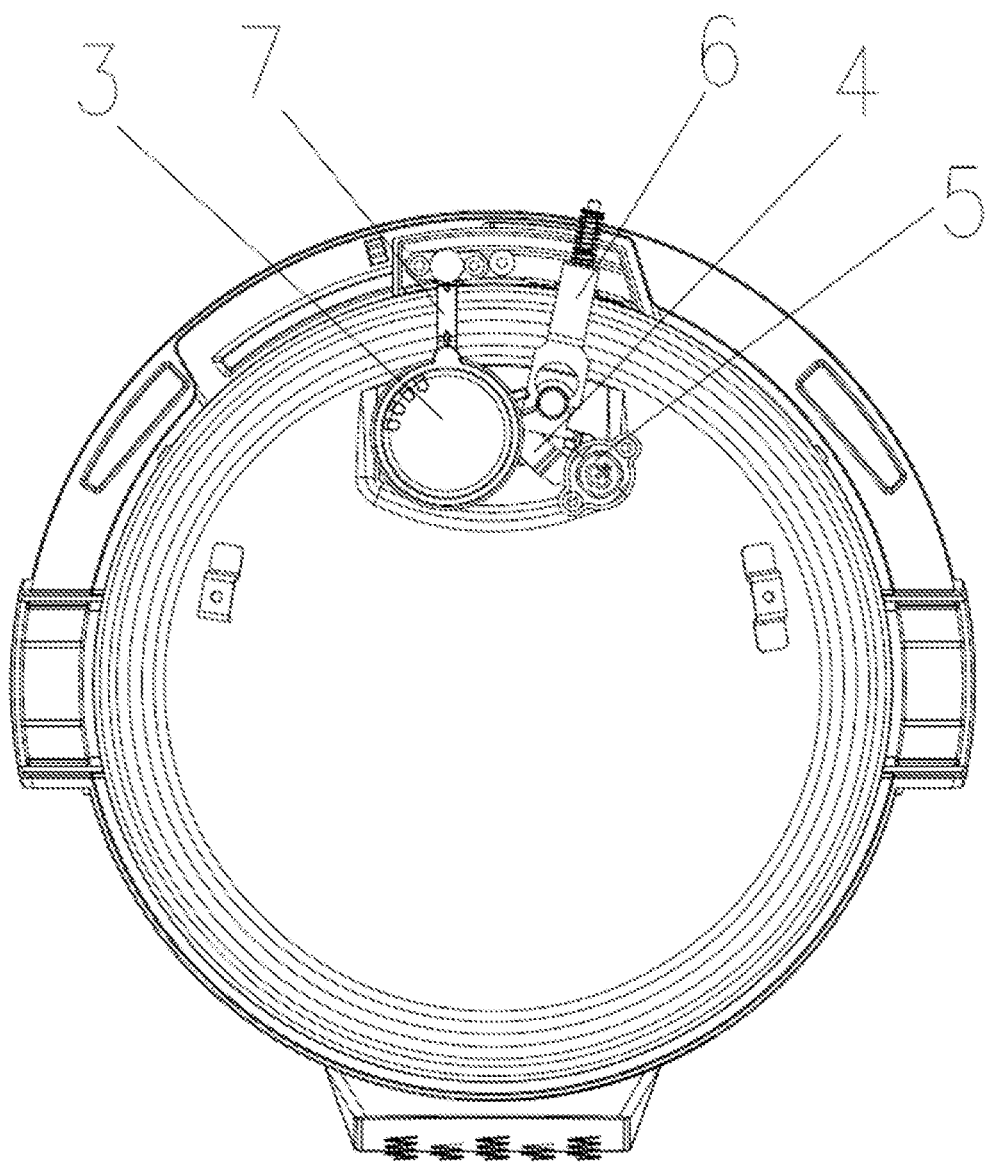
FIG. 2 is a top view of the cooking appliance of FIG. 1, wherein the lid is removed for ease of viewing.

Referring to FIGS. 1 and 2, a cooking appliance according to an example embodiment of the present disclosure is an electric pressure cooker. The cooking appliance comprises a lid 1 and a cooker body 2, the lid 1 being constructed and arranged for covering the cooker body 2. The lid 1 comprises a pressure-limiting valve 3 disposed thereon and a manually operated steam-discharging device, the steam-discharging device comprising a lever 4 and a button assembly 5, wherein the lever 4 is operable to be actuated by the button assembly 5 to pivot and push the pressure-limiting valve 3 upward.

With reference to FIGS. 3 to 6, the button assembly 5 comprises a steam-discharging button 51 and a button seat 52, the steam-discharging button 51 covering the button seat 52 and being fastened thereto, and being vertically movable relative to the button seat 52. A downward movement of the steam-discharging button 51 will actuate the lever 4 to push open the pressure-limiting valve 3 for steam discharging. The button assembly 5 further comprises a guiding rod 53 mounted thereto, the steam-discharging button 51 further comprises a heart-shaped groove 510, wherein a downward movement of the steam-discharging button 51 towards a predetermined position will cause a first end 530 of the guiding rod 53 to slide within the heart-shaped groove 510.

When the steam-discharging button 51 is released after reaching the predetermined position, following a track of the heart-shaped groove 510, the first end 530 of the guiding rod 53 will slide to a lock position A (see FIG. 6), to lockingly engage with the heart-shaped groove 510, so as to keep the steam-discharging button 51 at a steam-discharging position. As such, after the cooking is completed, to activate the manually operated steam-discharging device for rapid steam release, a user only needs to press down the steam-discharging button 51 once and release, and the steam-discharging button 51 will be kept at the steam-discharging position, causing the pressure-limiting valve 3 to continuously discharge steam from the cooker body. Advantageously, it is unnecessary for the user to keep the steam-discharging button 51 pressed down, thereby simplifying the steam-discharging operation.

Figure 4:
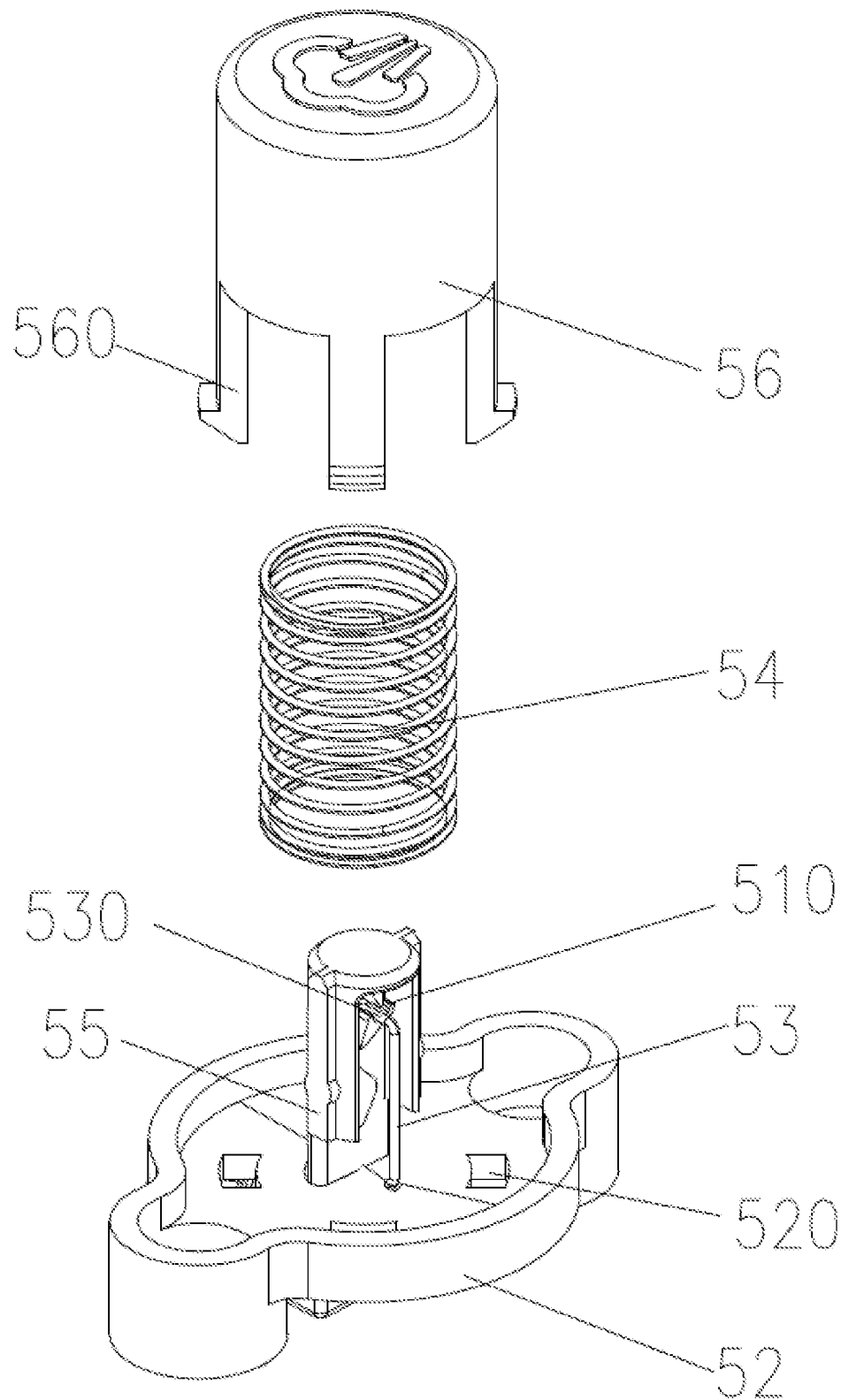
FIG. 4 is a perspective exploded view of the button assembly of the cooking appliance of FIG. 1.

To switch the pressure-limiting valve 3 from an open state to a closed state, the user only needs to push down the steam-discharging button 51 again. More particularly, as the guiding rod 53 is at the lock position A at this moment, pushing the steam-discharging button 51 downward again will cause the first end 530 of the guiding rod 53 to leave the lock position A, thereby unlocking the guiding rod 53 from the heart-shaped groove 510. Referring to FIG. 4, the button assembly 5 further comprises a spring 54, wherein the spring 54 is configured to upwardly bias the steam-discharging button 51 towards an initial position thereof, thereby causing the lever 4 to return to its original position so that the pressure-limiting valve 3 is correspondingly reset to the closed state.

Still referring to FIG. 1, the lid 1 comprises a lower lid portion 11 and an upper lid portion 12 covering the lower lid portion 11 from above. In FIG. 2, the upper lid portion 12 is removed from the view for ease of observation of components disposed above a surface of the lower lid portion 11. As shown, the button seat 52 is mounted on a top surface of the lower lid portion 11, the steam-discharging button 51 is constructed and arranged so that at least a portion thereof extends through and above the upper lid portion 12. The pressure-limiting valve 3 is not necessarily directly disposed on the surface of the lower lid portion 11; rather, it can be substantially received within a cavity (not shown) formed between the lower lid portion 11 and the upper lid portion 12. FIGS. 1 and 2 illustrate the location and/or configuration of the pressure-limiting valve 3 in relation to the lever 4 and the button assembly 5. The lever 4 can be hingedly coupled to the upper lid portion 12 or the lower lid portion 11, without limitation.

Figure 3:
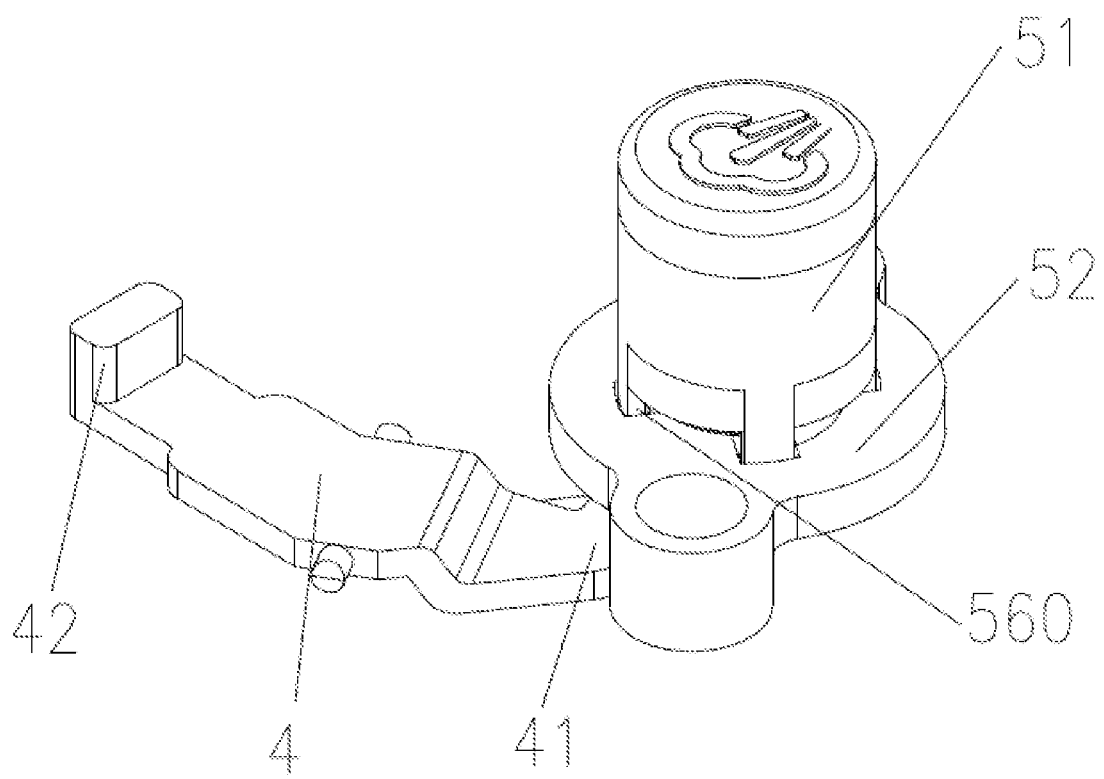
FIG. 3 is a schematic view showing engagement between a button assembly and a lever of the cooking appliance of FIG. 1.

Now, referring to FIGS. 3 and 4, the structures of the steam-discharging button 51 will be described in detail. In some embodiments, the steam-discharging button 51 comprises a plastic block 55 and a button cover 56 for covering the plastic block 55 from above. The heart-shaped groove 510 is formed on the plastic block 55. The plastic block 55 and the button cover 56 can be constructed and arranged to form a unibody, or can be separately constructed. In some example embodiments described herein, to simplify the corresponding molds, the plastic block 55 and the button cover 56 are separately formed and secured to each other, wherein the plastic block 55 is constructed and arranged to move with the button cover 56. The lever 4 comprises a first end 41 and an opposing second end 42. The plastic block 55 is operable to move downwardly through the button seat 52 so that a bottom portion of the plastic block 55 pushes the first end 41 of the lever 4 in a downward direction, thereby pivoting the second end 42 of the lever 4 upward to push open and activate the pressure-limiting valve 3 for steam discharging.

The button cover 56 comprises one or more latching arms 560 disposed thereon, the button seat 52 comprises one or more latching apertures 520 disposed thereon, wherein the latching arms 560 and the corresponding latching apertures 520 mutually latch to movably secure the button cover 56 and the plastic block 55 to the button seat 52 so that the button cover 56 and the plastic block 55 are movable in a substantially vertical direction relative to the button seat 52. The spring 54 is disposed between the steam-discharging button 51 and the button seat 52, and encloses the plastic block 55 and the guiding rod 53, so as to limit the movement of the guiding rod 53 to prevent the guiding rod 53 from sliding out of the heart-shaped groove 510.

Figure 5:
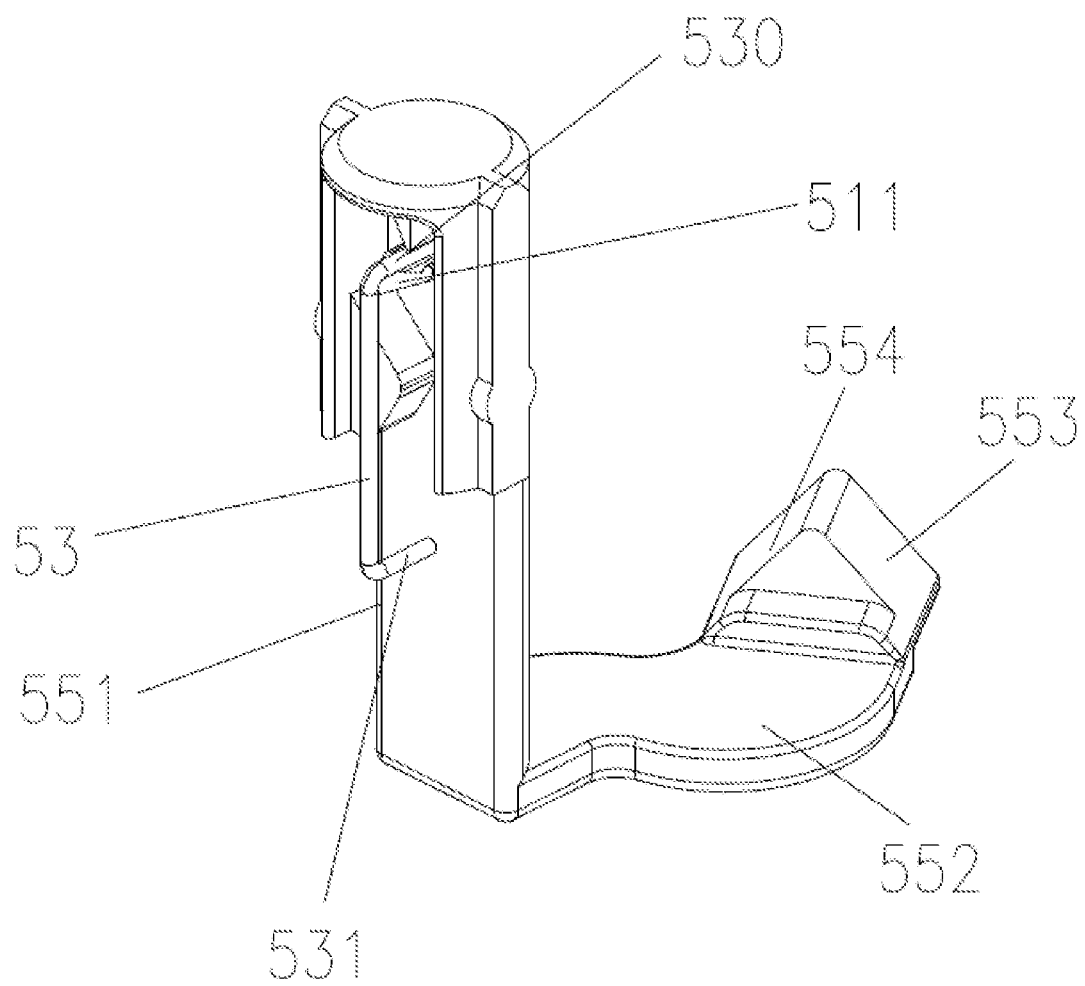
FIG. 5 is a perspective view of a plastic block of the cooking appliance of FIG. 1.

Referring to FIG. 5, in some embodiments, the guiding rod 53 is substantially U-shaped, and comprises a first end 530 and a second end 531, wherein the second end 531 of the guiding rod 53 is rotatably secured to a bottom portion of the button seat 52. The plastic block 55 is substantially L-shaped, and comprises a substantially vertically extending first portion 551 and a second portion 552 extending sideward from a bottom part of the first portion 551, wherein the heart-shaped groove 510 is disposed on a surface of the first portion 551 of the plastic block 55.

Figure 6:
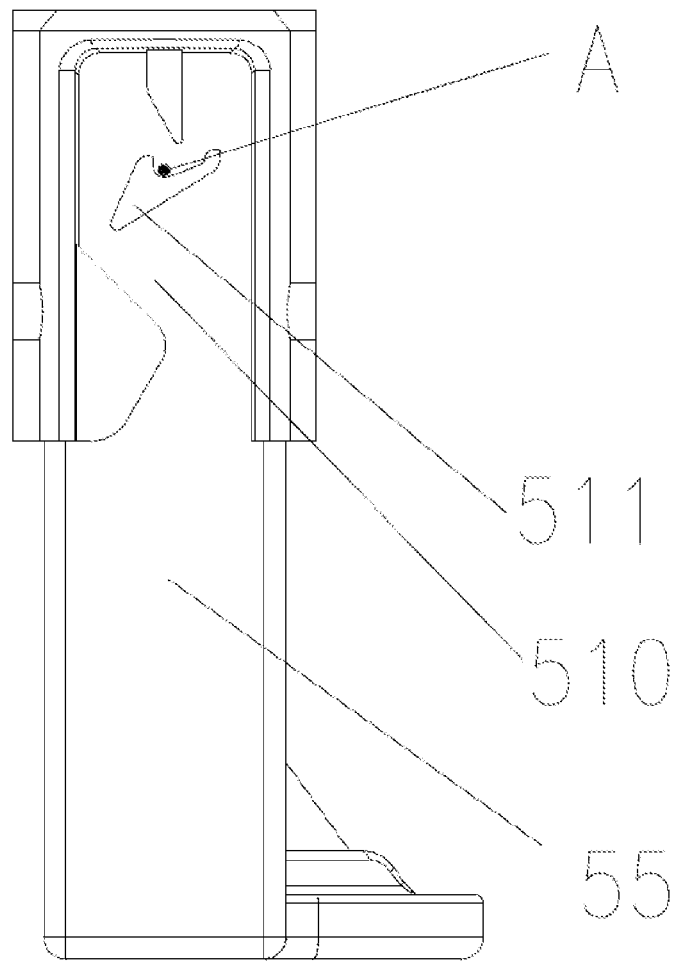
FIG. 6 is a planar view of the plastic block of the cooking appliance of FIG. 1.

Referring to FIG. 6, in some embodiments, the first portion 551 comprises a recessed portion and a heart-shaped block 511 disposed near a top part of the recessed portion, wherein the recessed portion encloses the heart-shaped block 511 and forms the heart-shaped groove 510, and wherein the heart-shaped block 511 is substantially oriented as an upright heart shape. The heart-shaped groove 510 is constructed and arranged to have a stepped bottom wall, such that when the steam-discharging button 51 is released after reaching the predetermined position, the first end 530 of the guiding rod 53 can only slide along the track of the heart-shaped groove 510 in one direction to the lock position A, and cannot slide in the reverse direction. A similar method can be found in the push-push structure of card connectors and has been discussed in certain patent literatures such as CN201773975U, and will not be described in detail herein.

Figure 7:
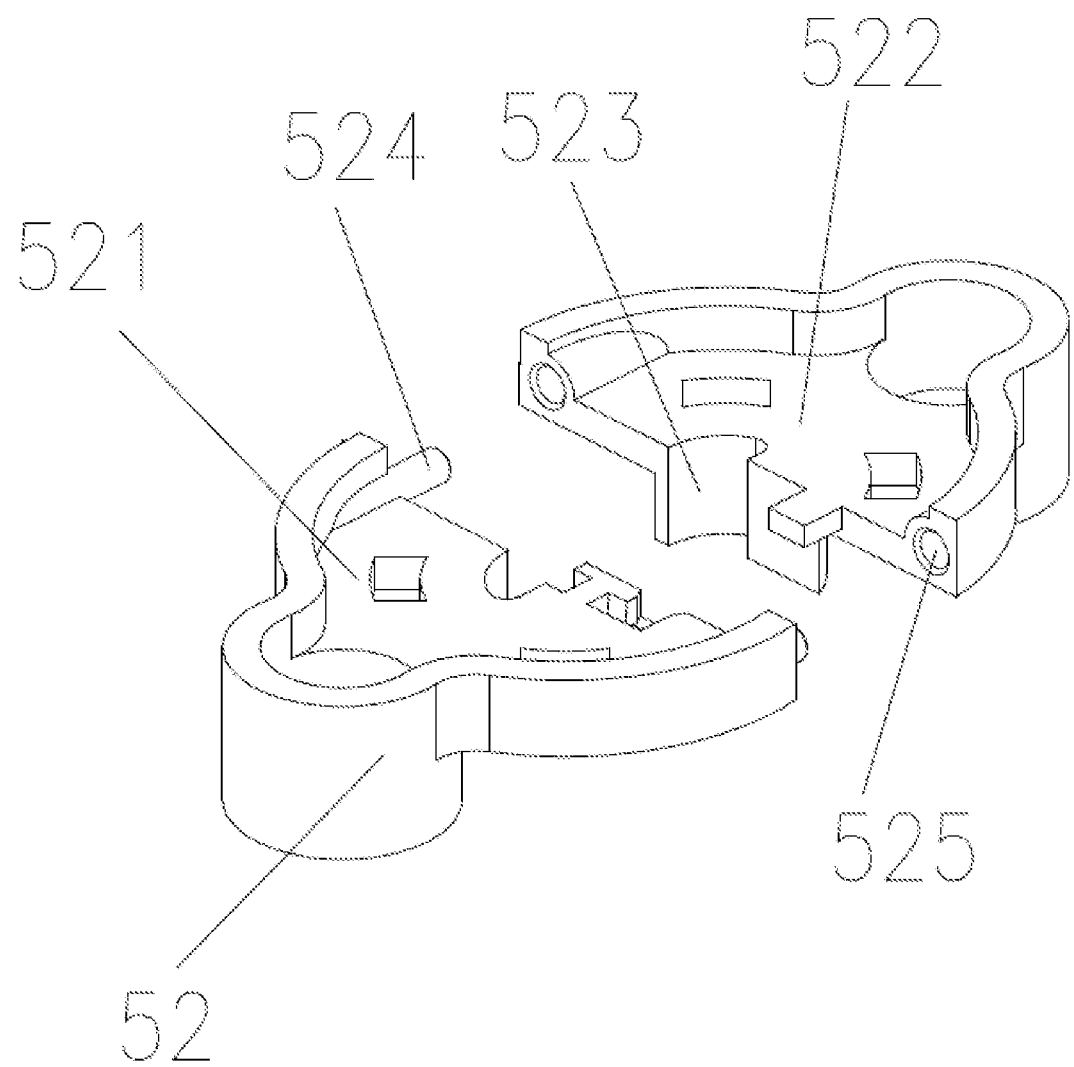
FIG. 7 is a perspective exploded view of a button seat of the button assembly of the cooking appliance of FIG. 1.

Referring to FIG. 7, in some embodiments, in order to allow the plastic block 55 or at least a portion thereof to extend through the button seat 52, the button seat 52 is formed by combining a first button seat 521 with a second button seat 522. The first button seat 521 and the second button seat 522 form a perforated seat opening 523 therebetween.

During the assembling process, the first portion 551 of the plastic block 55 is placed at the seat opening 523 of one button seat, the other button seat is coupled thereto such that the first portion 551 of the plastic block 55 is disposed between the first button seat 521 and the second button seat 522, extending through the seat opening 523, and is operable to move in a substantially vertical direction between the first button seat 521 and the second button seat 522. A surface of the first portion 551 engages with the seat opening 523 in a substantially interference free or friction free manner, so as to allow the first portion 551 to slide smoothly within the seat opening 523. In addition, a plurality of mutually connectable pins 524 and sockets 525 are provided on the two button seats 521, 522 and disposed therebetween to fasten the two button seats 521, 522 together, wherein the second portion 552 of the plastic block 55 is disposed under the button seat 52 so as to confine the plastic block 55 with the button seat 52.

Figure 8:
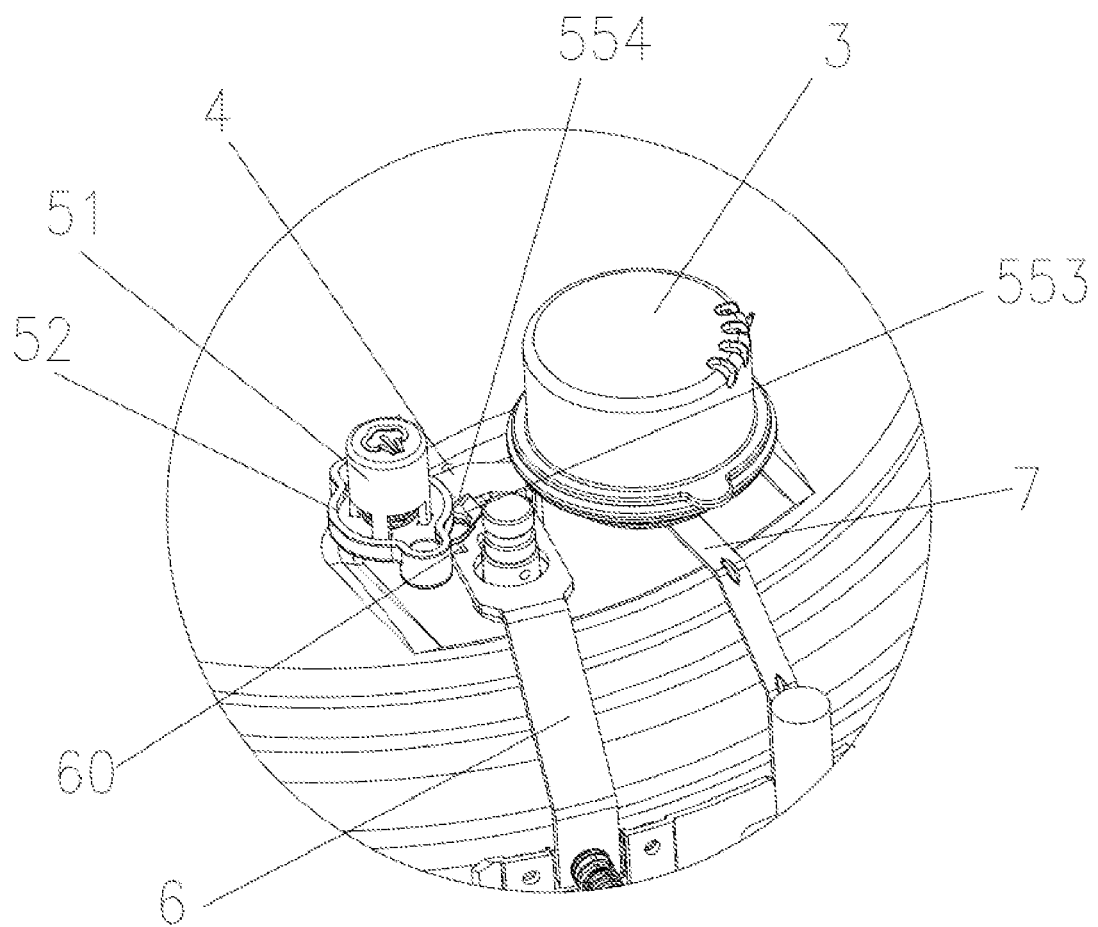
FIG. 8 is a partial magnified view of a top surface of a lower lid portion of a lid of the cooking appliance of FIG. 1.

Referring to FIGS. 5 and 8, in some embodiments, the second portion 552 of the plastic block 55 of the steam-discharging button 51 comprises a projecting block 553 at an end of the second portion 552, the projecting block 553 having a sloped surface 554. The lid 1 further comprises an opening-stop rod 6 constructed and arranged for outward sliding movement relative to the lid 1 when the lid 1 is rotated towards a closed position relative the cooker body. The opening-stop rod 6 comprises an indentation 60, wherein when the steam-discharging button 51 is at a higher location, namely, not at the steam-discharging position, the indentation 60 is located right below the projecting block 553, i.e., the second portion 552 of the plastic block 55 is located above the opening-stop rod 6, such that the opening-stop rod 6 is operable for the outward sliding movement without contacting the projecting block 553 and the second portion 552.

The second portion 552 is constructed and arranged in such a way that, when the steam-discharging button 51 is at the steam-discharging position, a bottom portion of the projecting block 553 is received within the indentation 60, so that the opening-stop rod 6 will downwardly press the sloped surface 554 during the outward sliding movement (which is essentially an operation that is equivalent to pressing the steam-discharging button 51 again), causing the plastic block 55 to move downwardly to unlock the guiding rod 53 from the heart-shaped groove 510, thereby allowing the spring 54 to bias the steam-discharging button 51 to move upwards to return to the initial position thereof and to cause the lever 4 to correspondingly return to the original position thereof. Advantageously, such structures help ensure that when the lid 1 is rotated towards the closed position, the manually operated steam-discharging device will not be activated and the pressure-limiting valve 3 is in the closed state.

Figure 9:
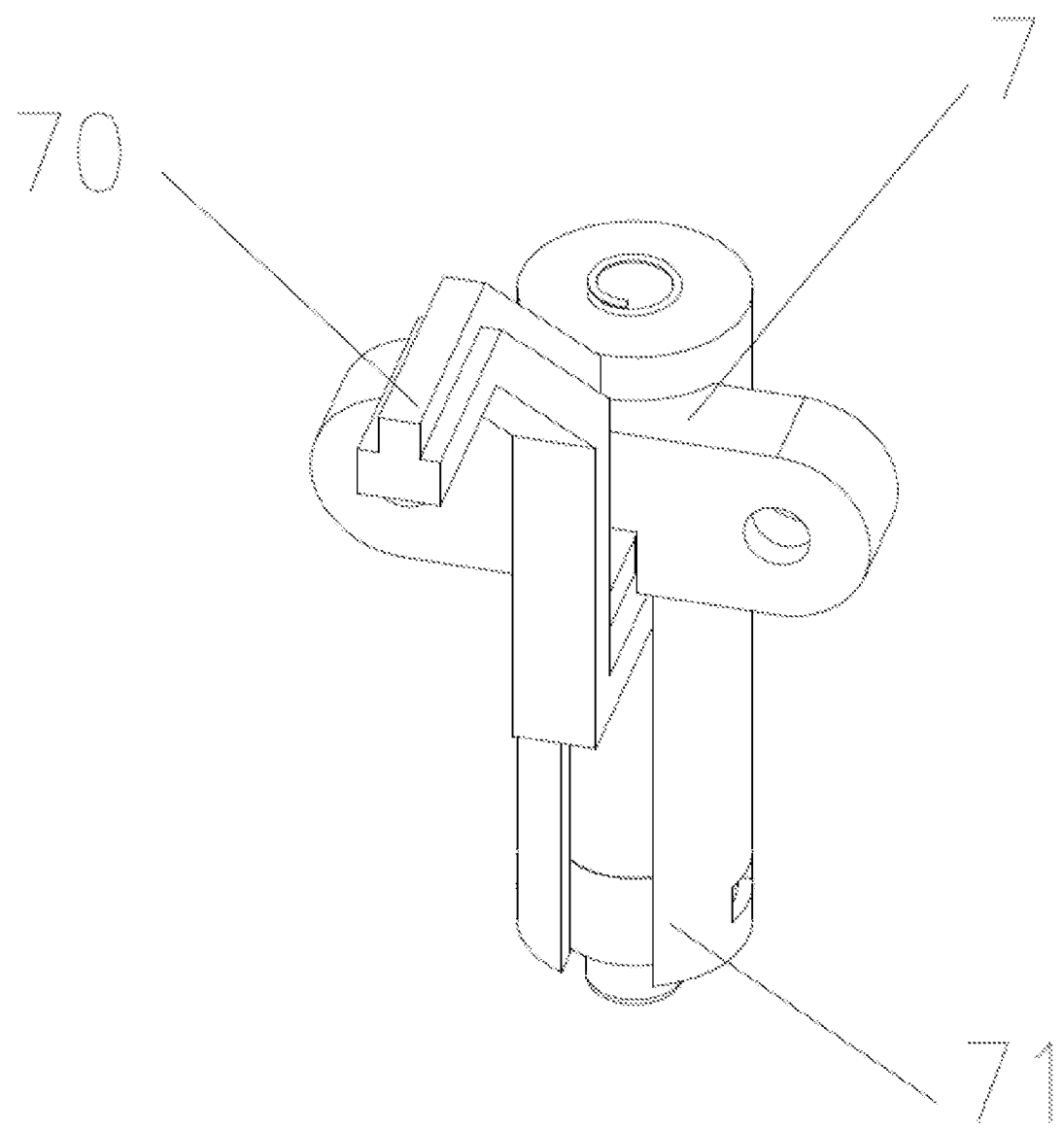
FIG. 9 is a perspective view illustrating a sliding rod of the cooking appliance of FIG. 1.
Figure 10:
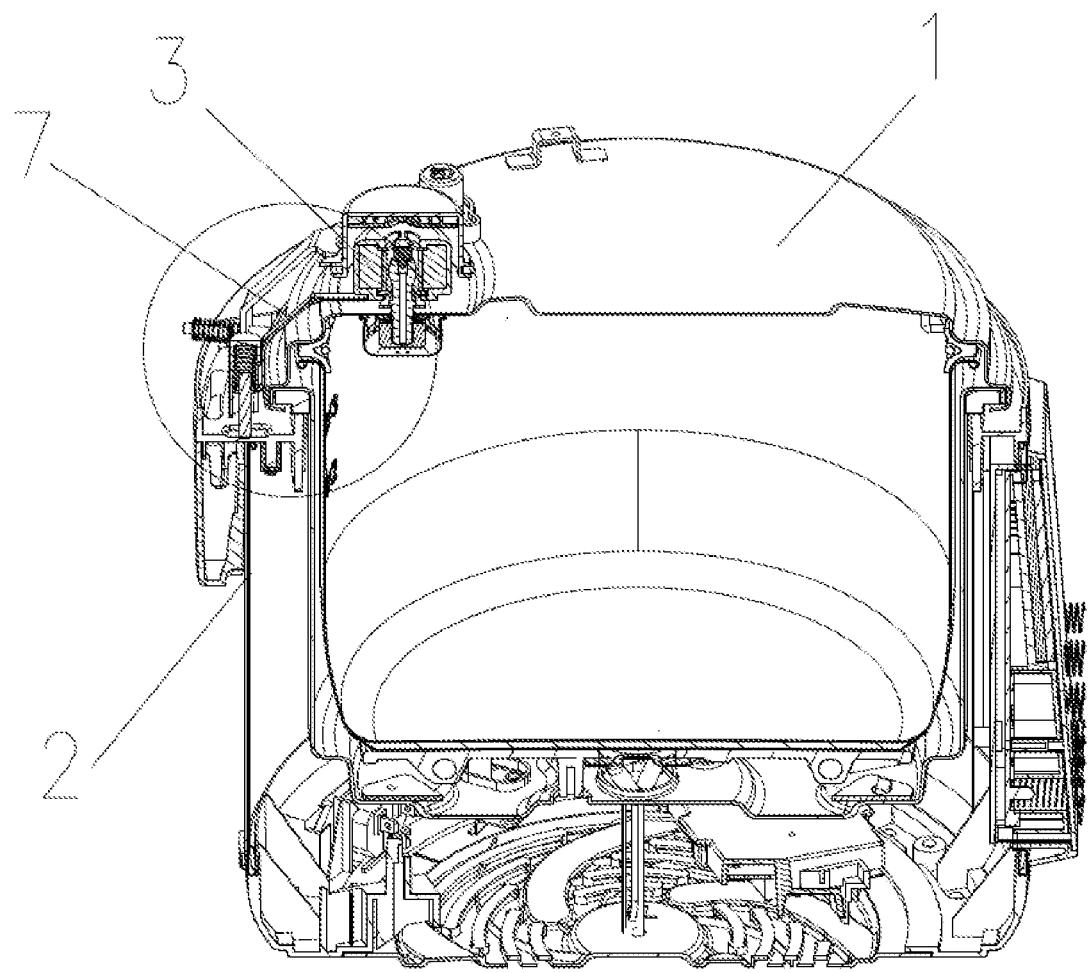
FIG. 10 is a sectional view of the cooking appliance of FIG. 1.
Figure 11:
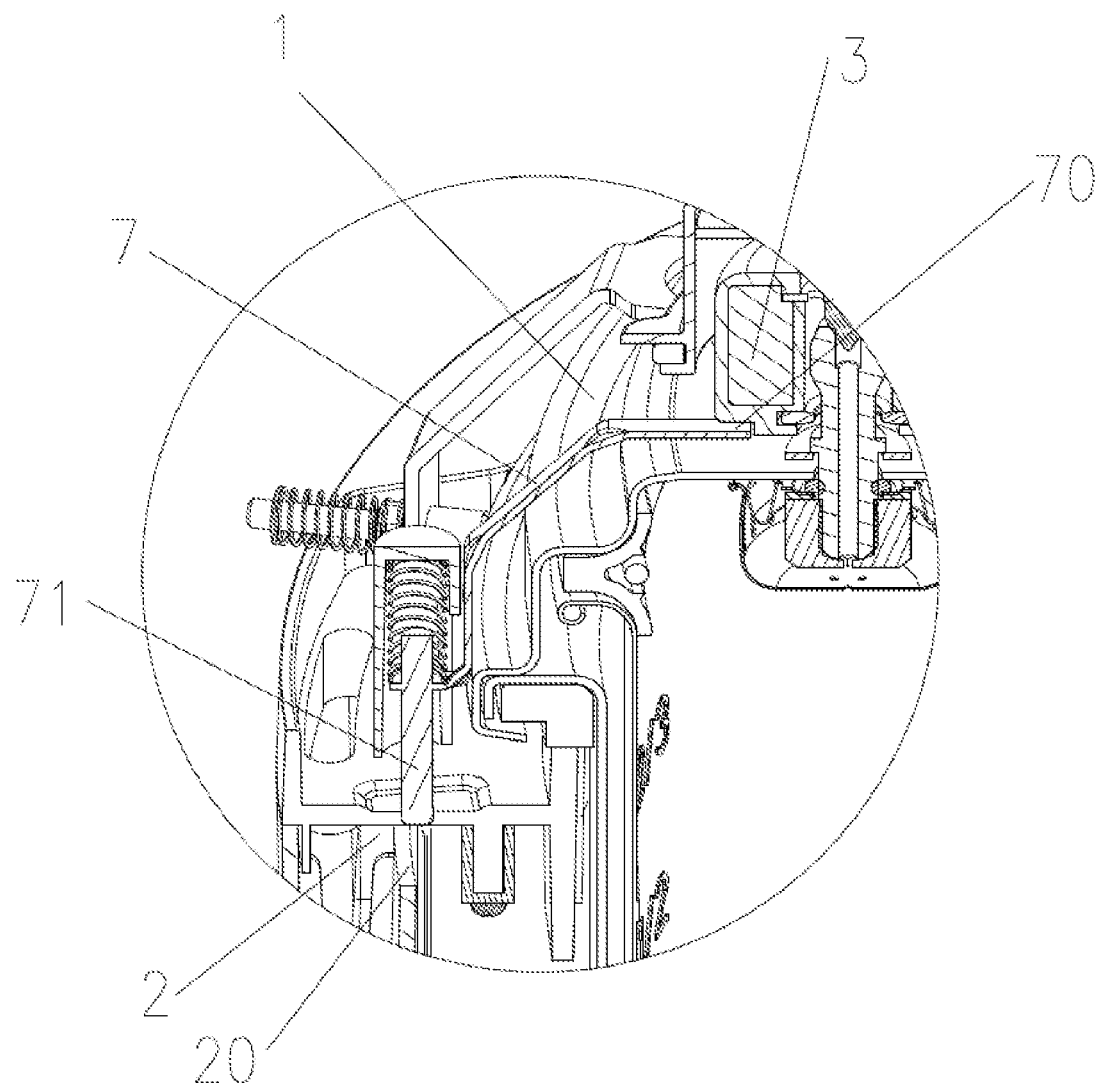
FIG. 11 is a magnified view of the circled area of FIG. 10.

Further, referring to FIGS. 9 to 11, with reference to FIGS. 1 and 2, in some embodiments, the lid 1 further comprises a sliding rod 7 disposed thereon. FIG. 9 is a perspective view of the sliding rod 7. FIG. 10 is a sectional view of the lid 1 viewed from a central line of the sliding rod 7. FIG. 11 is a partial magnified view of FIG. 10. As shown, the sliding rod 7 comprises a third end 70 and a fourth end 71 opposed thereto, at least a portion of the third end 70 extending under the pressure-limiting valve 3, the fourth end 71 extending along a portion of the lid 1 into the cooker body 2, wherein the cooker body 2 comprises a gradually elevated inclined surface 20 disposed therein, wherein when the lid 1 is rotated relative to the cooker body 2 towards an open position, the fourth end 71 is gradually elevated along the inclined surface 20, causing the third end 70 of the sliding rod 7 to push open the pressure-limiting valve 3, thereby opening the pressure-limiting valve 3 when the lid 1 is rotated towards the open position. As such, these embodiments of the present invention allow the pressure-limiting valve 3 to be opened for steam discharging simultaneously with the lid opening operation.

With a cooking appliance in accordance with example embodiments of the present disclosure, by pressing the steam-discharging button 51 on the lid 1 once, a user can lock the steam-discharging button 51 at a steam-discharging position, causing the pressure-limiting valve 3 to continuously discharge steam. Comparing with the prior art, there is no longer the need to keep the steam-discharging button pressed down, thereby simplifying the steam-discharging operation. Further, pressing the steam-discharging button 51 again will return the steam-discharging button 51 to an initial position thereof, thereby closing the pressure-limiting valve 3 to stop the steam discharging.

The foregoing is only preferred embodiments of the present application only, and is not intended to limit the present application. Any modifications, equivalent substitutions, improvements, etc., which are made within the spirit and principles of the present application should be included within the scope of protection of the present application.

The invention claimed is:

1. A cooking appliance comprising:
a cooker body;
a lid for covering the cooker body, the lid comprising a pressure-limiting valve, a lever, and a button assembly;
the button assembly comprising a steam-discharging button and a button seat;
the steam-discharging button being fastened to the button seat and being vertically movable for actuating the lever to push open the pressure-limiting valve for steam discharging;
the button assembly further comprises a guiding rod, a spring, and a plastic block having a heart-shaped groove
wherein the spring encloses the plastic block and the guiding rod, wherein a downward movement of the steam-discharging button towards a predetermined position will cause a first end of the guiding rod to slide within the heart-shaped groove, and when the steam-discharging button is released after reaching the predetermined position, the first end of the guiding rod will slide to a lock position to lockingly engage with the heart-shaped groove, so as to keep the steam-discharging button at a steam-discharging position.

2. The cooking appliance of claim 1, wherein:
when the guiding rod is at the lock position, pushing the steam-discharging button downward will cause the guiding rod to leave the lock position, thereby unlocking the guiding rod from the heart-shaped groove; and
the spring is operable to upwardly bias the steam-discharging button towards an initial position thereof, thereby causing the lever to return to its original position so that the pressure-limiting valve is correspondingly reset to a closed state.

3. The cooking appliance of claim 1, wherein:
the cooking appliance is an electric pressure cooker;
the lid comprises a lower lid portion and an upper lid portion covering the lower lid portion from above;
the button seat is secured on a top wall of the lower lid portion; and
at least a portion of the steam-discharging button extends through and above the upper lid portion.

4. The cooking appliance of claim 1, wherein:
the steam-discharging button comprises a button cover for covering the plastic block from above;
the plastic block is constructed and arranged to move with the button cover; the lever has a first end and an opposing second end;
at least a portion of the plastic block is operable to move downwardly through the button seat and press on the first end of the lever, thereby pivoting the second end of the lever upward to activate the pressure-limiting valve; and
the plastic block and the button cover are separately formed to simplify respective molds thereof.

5. The cooking appliance of claim 4, wherein:
the button cover comprises one or more latching arms disposed thereon;
the button seat comprises one or more latching apertures disposed thereon;
the latching arms and the corresponding latching apertures mutually latch to secure the button cover and the plastic block to the button seat; and
the spring is disposed between the steam-discharging button and the button seat and enclosing the plastic block and the guiding rod, so as to prevent the guiding rod from sliding out of the heart-shaped groove.

6. The cooking appliance of claim 1, wherein:
the guiding rod is substantially U-shaped and comprises a first end and a second end; and
the second end of the guiding rod is rotatably secured to a bottom portion of the button seat.

7. The cooking appliance of claim 1, wherein:
the plastic block is substantially L-shaped, and comprises a substantially vertically extending first portion, and a second portion extending sideward from a bottom part of the first portion; and
the heart-shaped groove is disposed on a surface of the first portion of the plastic block.

8. The cooking appliance of claim 7, wherein:
the button seat is formed by combining a first button seat with a second button seat;
the first portion of the plastic block is disposed between the first button seat and the second button seat and is vertically movable therebetween; and
the second portion of the plastic block is disposed under the button seat so as to confine the plastic block with the button seat.

9. The cooking appliance of claim 7, wherein:
the second portion of the plastic block comprises a projecting block having a sloped surface;
the lid comprises an opening-stop rod constructed and arranged for outward sliding movement relative to the lid when the lid is rotated towards a closed position relative to the cooker body; when the steam-discharging button is at a steam-discharging position, the opening-stop rod will downwardly press the sloped surface during the outward sliding movement, causing the plastic block to move downwardly to unlock the guiding rod from the heart-shaped groove, thereby allowing the spring to bias the steam-discharging button to return to an initial position thereof and to cause the lever to correspondingly return to an original position thereof, so as to put the pressure-limiting valve in a closed state when the lid is rotated towards the closed position; and
when the steam-discharging button is at a higher location, the second portion of the plastic block is located above the opening-stop rod, such that the opening-stop rod is operable for the outward sliding movement without contacting the projecting block.

10. The cooking appliance of claim 1, wherein:
the lid comprises a sliding rod disposed thereon;
the sliding rod comprises a third end and a fourth end opposed thereto, at least a portion of the third end extending under the pressure-limiting valve, the fourth end extending along a portion of the lid into the cooker body; and
the cooker body comprises a gradually elevated inclined surface disposed therein, wherein when the lid is rotated relative to the cooker body towards an open position, the fourth end is gradually elevated along the inclined surface, causing the third end of the sliding rod to push open the pressure-limiting valve, thereby opening the pressure-limiting valve when the lid is rotated towards the open position.

* * * * *